US007475011B2

(12) United States Patent
Deng et al.

(10) Patent No.: US 7,475,011 B2
(45) Date of Patent: Jan. 6, 2009

(54) GREEDY ALGORITHM FOR IDENTIFYING VALUES FOR VOCAL TRACT RESONANCE VECTORS

(75) Inventors: Li Deng, Sammamish, WA (US); Alejandro Acero, Bellevue, WA (US); Issam H. Bazzi, New York, NY (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 10/925,585

(22) Filed: Aug. 25, 2004

(65) Prior Publication Data

US 2006/0047506 A1 Mar. 2, 2006

(51) Int. Cl.
*G10L 19/06* (2006.01)
(52) U.S. Cl. .................. 704/209; 704/205; 704/220
(58) Field of Classification Search ......... 704/205–206, 704/209, 220, 243–244
See application file for complete search history.

(56) References Cited

U.S. PATENT DOCUMENTS

| | | | | | |
|---|---|---|---|---|---|
| 4,703,505 | A | * | 10/1987 | Seiler et al. ............... | 704/268 |
| 5,165,008 | A | * | 11/1992 | Hermansky et al. ......... | 704/262 |
| 5,233,660 | A | * | 8/1993 | Chen .......................... | 704/208 |
| 5,677,986 | A | * | 10/1997 | Amada et al. ............... | 704/222 |
| 6,393,392 | B1 | * | 5/2002 | Minde ........................ | 704/220 |
| 6,505,152 | B1 | * | 1/2003 | Acero ........................ | 704/209 |
| 6,850,884 | B2 | * | 2/2005 | Gao et al. ................... | 704/224 |
| 6,931,374 | B2 | * | 8/2005 | Attias et al. ................ | 704/240 |
| 2004/0199382 | A1 | * | 10/2004 | Bazzi et al. ................ | 704/209 |

OTHER PUBLICATIONS

G. Kopec, "Formant Tracking using Hidden Markov Models and Vector Quantization," IEEE Trans. Acoust., Speech, and Signal Processing, vol. 34, Aug. 1986, pp. 709-729.*

Subramanian et al, "PDF optimized parametric vector quantization of speech line spectral frequencies," IEEE Workshop on Speech Coding, Delavvan, Wisconsin, U.S.A., Sep. 2000, pp. 130-142.*

D. Broad and F. Clermont, Formant Estimation by Linear Transformation of the LPC Cepstrum, *J. Acout. Soc. Am.*, vol. 86, 1989, pp. 2013-2017.

L. Deng and D. Geisler, "A Composite Auditory Model for Processing Speech Sounds," *J. Acoust. Soc. Am.*, vol. 82, Dec. 1987, pp. 2001-2012.

H. Hermansky and D. Braod, "The Effective Second Formant F2 and the Vocal Tract Front-Cavity," *Proc. ICASSP*, vol. 1, 1989, pp. 480-483.

D. Klatt, "Software for a Cascade/Parallel Formant Synthesizer," *J. Acoust. Soc. Am.*, vol. 67, 1980, pp. 971-995.

(Continued)

*Primary Examiner*—James S Wozniak
(74) *Attorney, Agent, or Firm*—Theodore M. Magee; Westman, Champlin & Kelly, P.A.

(57) ABSTRACT

A method and apparatus identify values for components of a vocal tract resonance vector by sequentially determining values for each component of the vocal tract resonance vector. To determine a value for a component, the other components are set to static values. A plurality of values for a function are then determined using a plurality of values for the component that is being determined while using the static values for all of the other components. One of the plurality of values for the component is then selected based on the plurality of values for the function.

17 Claims, 6 Drawing Sheets

OTHER PUBLICATIONS

S. McCandless, "An Algorithm for Automatic Formant Extraction Using Linear Prediction Spectra," *IEEE Trans. Acoust. Speech and Signal Proc.*, vol. 22, 1974, pp. 135-141.

C.S. Huang and H.C. Wang, "Bandwidth-Adjusted LPC Analysis for Robust Speech Recognition,;" *Pattern Recognition Letters,* vol. 24, 2003 pp. 1583-1587.

A.P. Dempster, N.M. Laird, and D.B. Rubin, "Maximum Likelihood from Incomplete Data Via the EM Algorithm," *J. Royal Statistical Society,* vol. 39, No. 1, pp. 1-38, 1997.

J. Holmes, W. Holmes, and P. Garner, Using Format Frequencies in Speech Recognition,: in *Proc. Eurospeech,* Rhodes, Greece, Sep. 1997, pp. 2083-2086.

Seide, F. et al., "Coarticulation Modeling by Embedding a Target-Directed Hidden Trajectory Model into HMM -Map Decoding and Evaluation," *Proc. ICASSP,* 2003, pp. 748-751.

L. Deng, et al., "Spontaneous Speech Recognition Using a Statistical Coarticulatory Model for the Vocal-Tract-Dynamics," *J. Acoust. Soc. Am.,* vol. 108, 2000, pp. 3036-3048.

Sun, J. et al., "Data-Driven Model Construction for Continuos Speech Recognition Using Overlapping Articulatory Features," *Proc. ICSLP,* 2000, vol. 1, pp. 437-440.

S. Dusan et al., "Recovering Vocal Tract Shapes From MFCC Parameters," *Proc. ICSLP,* 1998, pp. 3087-3090.

L. Deng, et al., "Tracking Vocal Tract Resonance Using an Analytical Nonlinear Predictor and a Target-Guided Temporal Constraint," *Proc. Eurospeech,* 2003, vol. I, pp. 73-76.

A. Acero, "Formant Analysis and Synthesis Using Hidden Markov Models," in *Proc. Eurospeech,* Budapest, Sep. 1999.

Bazzi, I. et al., "An Expectation Maximization Approach for Formant Tracking Using a Parameter-Free Non-Linear Predictor," *Proc. ICASSP,* Hong Kong, Apr. 2003.

Bruce, I. et al., "Robust Formant Tracking in Noise," *Proc. ICASSP,* Orlando, FL, 2002, pp. 281-284.

Deng, Li et al., Speech Processing—*A Dynamic and Optimization-Oriented Approach,* Chapters 7 and 10, Marcel Dekker Inc., New York, NY, 2003.

\* cited by examiner

GREEDY ALGORITHM FOR IDENTIFYING VALUES FOR VOCAL TRACT RESONANCE VECTORS

BACKGROUND OF THE INVENTION

The present invention relates to speech recognition systems and in particular to speech recognition systems that exploit vocal tract resonances in speech.

In human speech, a great deal of information is contained in the first three or four resonant frequencies of the speech signal. In particular, when a speaker is pronouncing a vowel, the frequencies (and to a less extent, bandwidths) of these resonances indicate which vowel is being spoken.

Such resonant frequencies and bandwidths are often referred to collectively as formants. During sonorant speech, which is typically voiced, formants can be found as spectral prominences in a frequency representation of the speech signal. However, during non-sonorant speech, the formants cannot be found directly as spectral prominences. Because of this, the term "formants" has sometimes been interpreted as only applying to sonorant portions of speech. To avoid confusion, some researchers use the phrase "vocal tract resonance" to refer to formants that occur during both sonorant and non-sonorant speech. In both cases, the resonance is related to only the oral tract portion of the vocal tract.

To detect formants, systems of the prior art analyzed the spectral content of a frame of the speech signal. Since a formant can be at any frequency, the prior art has attempted to limit the search space before identifying a most likely formant value. Under some systems of the prior art, the search space of possible formants is reduced by identifying peaks in the spectral content of the frame. Typically, this is done by using linear predictive coding (LPC) which attempts to find a polynomial that represents the spectral content of a frame of the speech signal. Each of the roots of this polynomial represents a possible resonant frequency in the signal and thus a possible formant.

One system, developed by the present inventors, identified vocal tract resonance frequencies and bandwidths by limiting the possible values of the frequencies and bandwidths to a set of quantized values. This system used a residual model that described the difference between observed feature vectors and a set of simulated feature vectors. The simulated feature vectors were constructed using a function that was a sum of a set of sub-functions. Each sub-function was a non-linear function of one of the vocal tract resonance frequencies and one of the vocal tract resonance bandwidths.

While this system was an improvement over prior art systems, it was still not as fast as desired because training of the residual model parameters required a summation over all possible combinations of values for the vocal tract resonance frequencies and bandwidths. Under one quantization scheme, this required a summation over 20 million possible combinations. Thus, a technique is needed that allows this system to be used without requiring a summation over all possible combinations of the vocal tract resonance frequencies and bandwidths.

SUMMARY OF THE INVENTION

A method and apparatus identify values for components of a vocal tract resonance vector by sequentially determining values for each component of the vocal tract resonance vector. To determine a value for a component, the other components are set to static values. A plurality of values for a function are then determined using a plurality of values for the component that is being determined while using the static values for all of the other components. One of the plurality of values for the component is then selected based on the plurality of values for the function.

DETAILED DESCRIPTION OF ILLUSTRATIVE EMBODIMENTS

Figure 1:
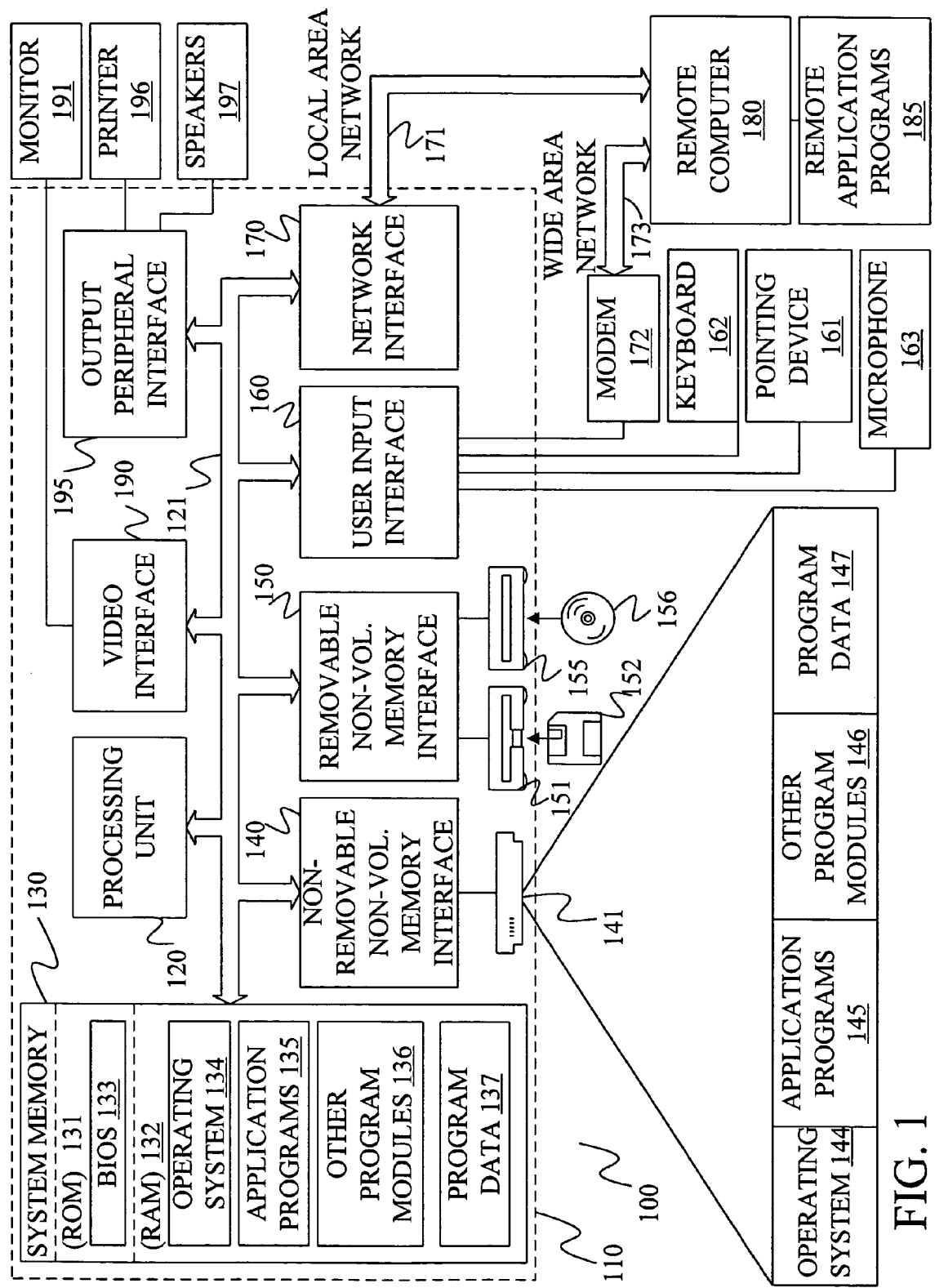
FIG. 1 is a block diagram of a general computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
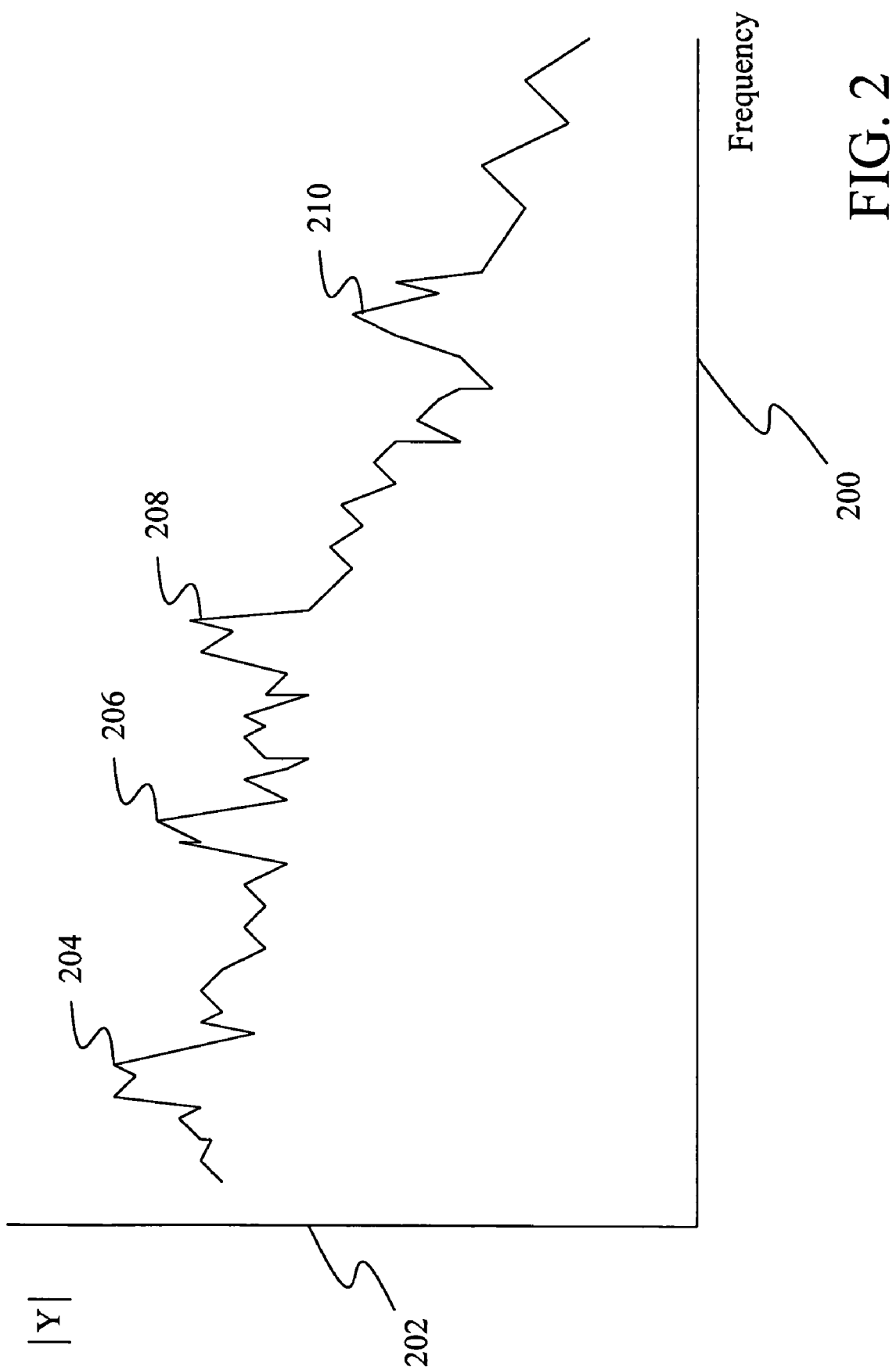
FIG. 2 is a graph of the magnitude spectrum of a speech signal.

FIG. 2 is a graph of the frequency spectrum of a section of human speech. In FIG. 2, frequency is shown along horizontal axis 200 and the magnitudes of the frequency components are shown along vertical axis 202. The graph of FIG. 2 shows that sonorant human speech contains resonances or formants, such as first formant 204, second formant 206, third formant 208, and fourth formant 210. Each formant is described by its center frequency, F, and its bandwidth, B.

The present invention provides methods for identifying the formant frequencies and bandwidths in a speech signal, both in sonorant and non-sonorant speech by utilizing a residual model.

The residual model is based on the difference between a set of observation training feature vectors and a set of simulated feature vectors. In terms of an equation:

$$v_t = o_t - C(x_t[i])$$ EQ. 1 where $v_t$ is the residual, $o_t$ is the observed training feature vector at time t and $C(x_t[i])$ is a simulated feature vector.

Figure 4:
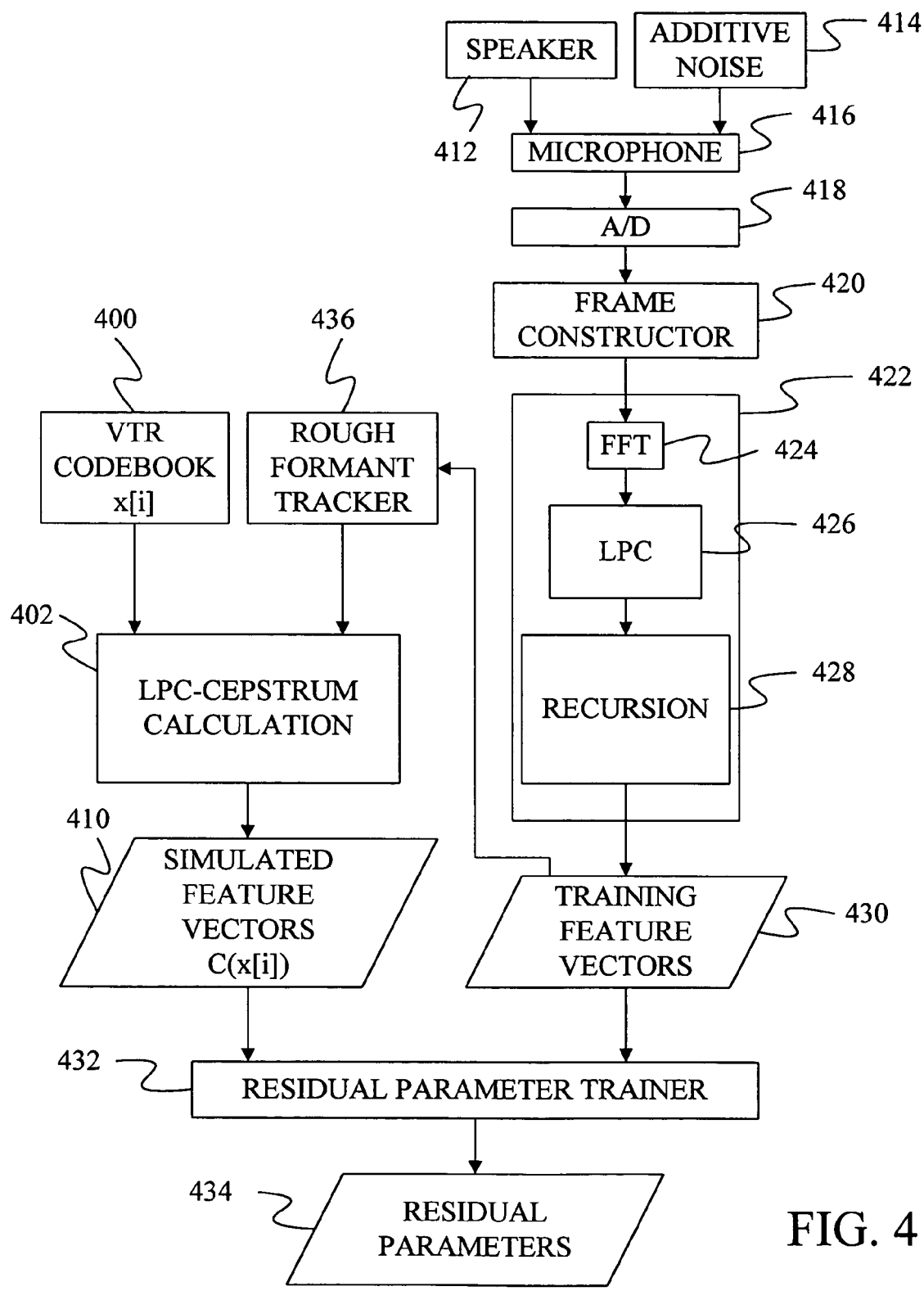
FIG. 4 is a block diagram of a training system for training a residual model under one embodiment of the present invention.

As shown in FIG. 4, the simulated feature vectors $C(x_t[i])$ 410 are constructed when needed by applying a set of VTRs $x_t[i]$ in a VTR codebook 400 to an LPC-Cepstrum calculator 402, which performs the following calculation:

$$C_n(x_t[i]) = \sum_{k=1}^{K} \frac{2}{n} - e^{-\pi n \frac{b_k[i]}{f_s}} \cos\left(2\pi n \frac{f_k[i]}{f_s}\right)$$ EQ. 2 where $C_n(x_t[i])$ is the nth element in an nth order LPC-Cepstrum feature vector, K is the number of VTRs, $f_k$ is the kth VTR frequency, $b_k$ is the kth VTR bandwidth, and $f_s$ is the sampling frequency, which in many embodiments is 8 kHz or 16 kHz. The $C_0$ element is set equal to log G, where G is a gain.

To produce the observed training feature vectors $o_t$ used to train the residual model, a human speaker 412 generates an acoustic signal that is detected by a microphone 416, which also detects additive noise 414. Microphone 416 converts the acoustic signals into an analog electrical signal that is provided to an analog-to-digital (A/D) converter 418. The analog signal is sampled by A/D converter 418 at the sampling frequency $f_s$ and the resulting samples are converted into digital values. In one embodiment, A/D converter 418 samples the analog signal at 8 kHz with 16 bits per sample, thereby creating 16 kilobytes of speech data per second. The digital samples are provided to a frame constructor 420, which groups the samples into frames. Under one embodiment, frame constructor 420 creates a new frame every 10 milliseconds that includes 25 milliseconds worth of data.

The frames of data are provided to an LPC-Cepstrum feature extractor 422, which converts the signal to the frequency domain using a Fast Fourier Transform (FFT) 424 and then identifies a polynomial that represents the spectral content of a frame of the speech signal using an LPC coefficient system 426. The LPC coefficients are converted into LPC cepstrum coefficients using a recursion 428. The output of the recursion is a set of training feature vectors 430 representing the training speech signal.

Under one embodiment, $v_t$ is a single Gaussian with mean h and a precision matrix D, where h is a vector with a separate mean for each component of the feature vector and D may be implemented as a diagonal matrix with a separate value for each component of the feature vector.

These parameters are trained using an Expectation-Maximization (EM) algorithm under one embodiment of the present invention.

In the past, the E-step of this algorithm has involved determining a posterior probability $\gamma_t(i) = p(x_t[i]|o_1^N)$. After the E-step was performed, an M-step was performed to determine the mean h and the variance $D^{-1}$ (the inverse of the precision matrix) of the residual using:

$$\hat{h} = \frac{\sum_{t=1}^{N} \sum_{i=1}^{I} \gamma_t(i)\{o_t - C(x_t[i])\}}{N}$$ EQ. 3

$$\hat{D}^{-1} = \frac{\sum_{t=1}^{N} \sum_{i=1}^{I} \gamma_t(i)\{o_t - C(x_t[i]) - \hat{h}\}^2}{N}$$ EQ. 4 where N is the number of frames in the training utterance, I is the number of quantization combinations for the VTRs, $o_t$ is the observed feature vector at time t and $C(x_t[i])$ is a simulated feature vector for VTRs $x_t[i]$.

However, this EM training algorithm is computationally expensive because it requires a summation over all possible quantization combinations, which exceeds 20 million combinations using the quantization levels shown above.

Figure 3:
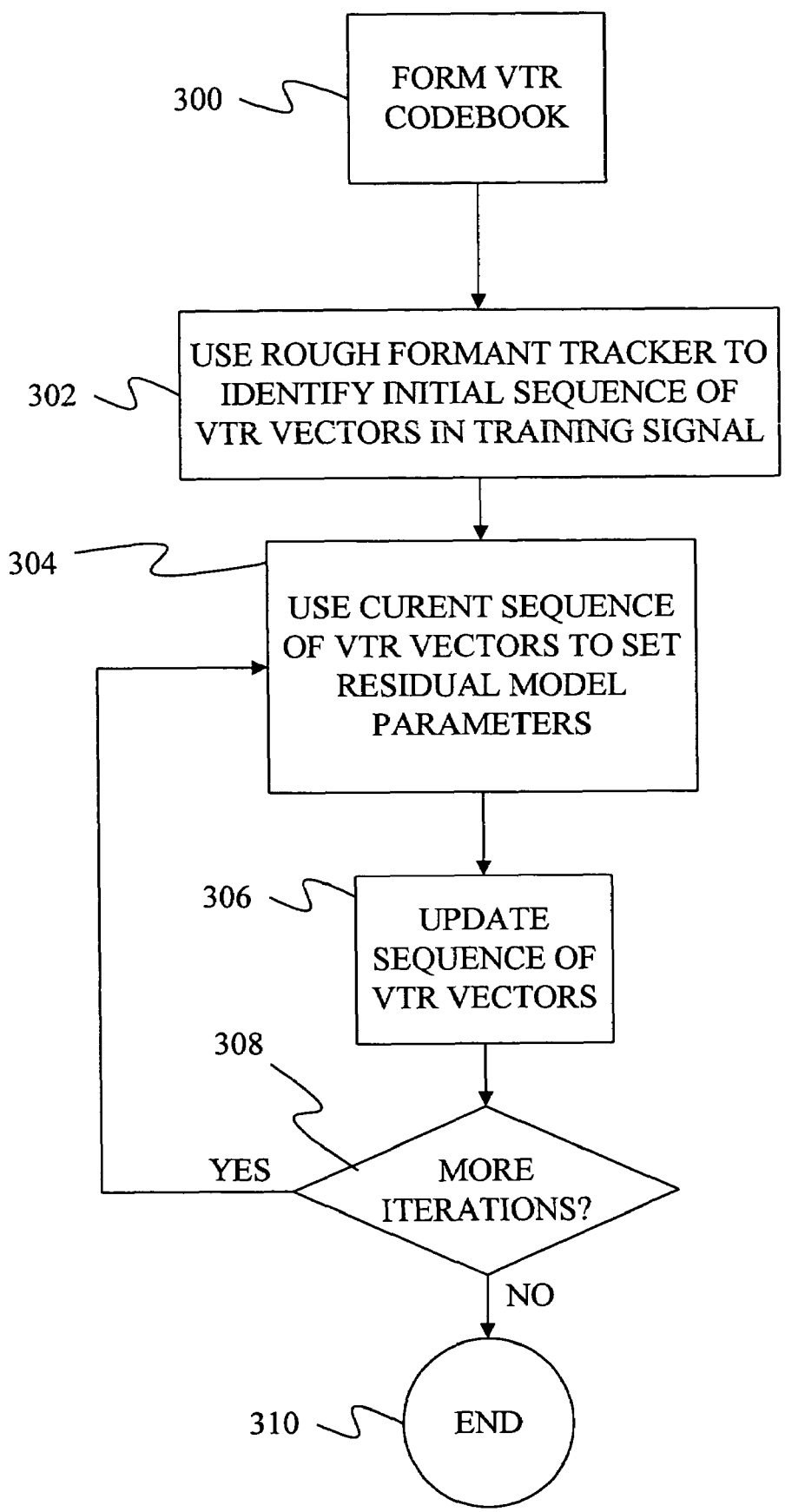
FIG. 3 is a flow diagram of a method for training a residual model under the present invention.

FIG. 3 provides a flow diagram of an EM training algorithm for training the residual model that is less computationally expensive than an exhaustive search.

The process of FIG. 3 begins at step 300, where vocal tract resonance (VTR) codebook 400 is constructed by quantizing the possible VTR frequencies and bandwidths to form a set of quantized values and then forming entries for different combinations of the quantized values. Thus, the resulting codebook contains entries that are vectors of VTR frequencies and bandwidths. For example, if the codebook contains entries for four VTRs, the ith entry x[i] in the codebook would be a vector of $[F_{1i}, B_{1i}, F_{2i}, B_{2i}, F_{3i}, B_{3i}, F_{4i}, B_{4i}]$ where $F_{1i}$, $F_{2i}$, $F_{3i}$, and $F_{4i}$ are the frequencies of the first, second, third and fourth VTRs and $B_{1i}$, $B_{2i}$, $B_{3i}$, and $B_{4i}$ are the bandwidths for the first, second, third and fourth VTRs. In the discussion below, the index to the codebook, i, is used interchangeably with the value stored at that index, x[i]. When the index is used alone below, it is intended to represent the value stored at that index.

Under one embodiment, the formants and bandwidths are quantized according to the entries in Table 1 below, where Min(Hz) is the minimum value for the frequency or bandwidth in Hertz, Max(Hz) is the maximum value in Hertz, and "Num. Quant." is the number of quantization states. For the frequencies and the bandwidths, the range between the minimum and maximum is divided by the number of quantization states to provide the separation between each of the quantization states. For example, for bandwidth $B_1$ in Table 1, the range of 260 Hz is evenly divided by the 5 quantization states such that each state is separated from the other states by 65 Hz. (i.e., 40, 105, 170, 235, 300).

TABLE 1

|  | Min(Hz) | Max(Hz) | Num. Quant. |
|---|---|---|---|
| $F_1$ | 200 | 900 | 20 |
| $F_2$ | 600 | 2800 | 20 |
| $F_3$ | 1400 | 3800 | 20 |
| $F_4$ | 1700 | 5000 | 40 |
| $B_1$ | 40 | 300 | 5 |
| $B_2$ | 60 | 300 | 5 |
| $B_3$ | 60 | 500 | 5 |
| $B_4$ | 100 | 700 | 10 |

The number of quantization states in Table 1 could yield a total of more than 100 million different sets of VTRs. However, because of the constraint $F_1<F_2<F_3<F_4$ there are substantially fewer sets of VTRs in the VTR search space defined by the codebook.

At step 302, training feature vectors 430 are applied to a rough formant tracker 436 to identify an initial sequence of VTR vectors. Such a formant tracker can include LPC formant trackers that identify spectral peaks based on the LPC feature vectors.

At step 304, the initial sequence of VTR vectors are applied to LPC-cepstrum calculator 402 to produce an initial set of simulated feature vectors, which is used to identify values for the residual model parameters. In step 304, a simplifying assumption is made that the posterior probability associated with a simulated feature vector is 1 for the optimally selected VTR quantization value sequence i*. As a result, the update equations for the mean and variance become:

$$\hat{h} = \frac{\sum_{t=1}^{N}\{o_t - C(x_t[i^*])\}}{N} \quad \text{EQ. 5}$$

$$\hat{D}^{-1} = \frac{\sum_{t=1}^{N}\{o_t - C(x_t[i^*]) - \hat{h}\}^2}{N} \quad \text{EQ. 6}$$

resulting in the elimination of the summation over all possible quantization combinations.

Once initial values for the residual model parameters have been determined, the sequence of optimal VTR vectors is found using dynamic programming at step 306. In particular, a Viterbi decoding algorithm is utilized where each node in the trellis diagram has an optimal partial score of:

$$\delta_t(i) = \max_{x[i]_1^{t-1}} \prod_{\tau=1}^{t-1} p(o_\tau | x_\tau[i]) p(o_t | x_t[i] = x[i]) \times$$

$$p(x[i]_1) \prod_{\tau=2}^{t-1} p(x_\tau[i] | x_{\tau-1}[i]) p(x_\tau[i] = x[i] | x_{t-1}[i]) \quad \text{EQ. 7}$$

Based on the optimality principle, the optimal partial likelihood at the processing stage of t+1 can be computed using the following Viterbi recursion:

$$\delta_{t+1}(i) = \max_{i'} \delta_t(i') p(x_{t+1}[i] = x[i] | x_t[i'] = x[i']) p(o_{t+1} | x_{t+1}[i] = x[i]) \quad \text{EQ. 8}$$

Under one embodiment, the "transition" probability $p(x_{t+1}[i]=x[i]|x_t[i]=x[i'])$ is modeled as a Gaussian distribution of:

$$p(x_{t+1}[i]=x[i]|x_t[i]=x[i'])=N(x_{t+1}[i];x_t(i'),B) \quad \text{EQ. 9}$$

where the mean of the distribution is the previous VTR vector $x_t(i')$ and B is the precision matrix of the distribution. Under one embodiment, B is trained using:

$$B^{-1} = \frac{\sum_{t=1}^{N}[x_t[i^*] - x_{t-1}[j^*]][x_t[i^*] - x_{t-1}[j^*]]^{Tr}}{N} \quad \text{EQ. 10}$$

where i* and j* are the optimally selected indices by the dynamic programming algorithm, and superscript Tr indicates vector transpose.

In other embodiments, B is a diagonal matrix, with each element of the diagonal being set to the square of the VTR bandwidth associated with the vector element that aligns with the diagonal element. For example, for the diagonal element aligned with VTR frequency $f_1$, the square of the bandwidth $b_1$ would be used.

The observation probability $p(o_{t+1}|x_{t+1}[i]=x[i])$ of Equation 8 is treated as a Gaussian and is computed from observation equation 1 and the residual parameters h and D such that:

$$p(o_{t+1}|x_{t+1}[i]=x[i])=N(o_{t+1};C(x_{t+1}[i])+h,D) \quad \text{EQ. 11}$$

Thus, the probability is calculated as:

$$p(o_{t+1}|x_{t+1}[i]=x[i]) = A \exp\left[\frac{(o_{t+1} - C(x_{t+1}[i]) - h)^2}{2D^{-1}}\right] \quad \text{EQ. 12}$$

Under many embodiments, a simplifying assumption is made that the transition probabilities can be ignored when trying to find the VTR vector that maximizes the probability of Equation 8. Thus, finding the VTR vector that maximizes the probability of Equation 8 involves finding the VTR vector that maximizes the observation probability of Equation 12.

Instead of doing an exhaustive search of all possible VTR vectors, which is computationally expensive, the present invention uses a greedy algorithm that searches for individual elements of the VTR vector one at a time, selecting the locally best value for each element. This substantially reduces the number of computations that must be performed. For example, for an exhaustive search, over 25 million combinations must be examined to determine which combination maximizes the observation probability. However, using the greedy algorithm of the present invention, only 300-500 operations need to be performed.

Figure 5:
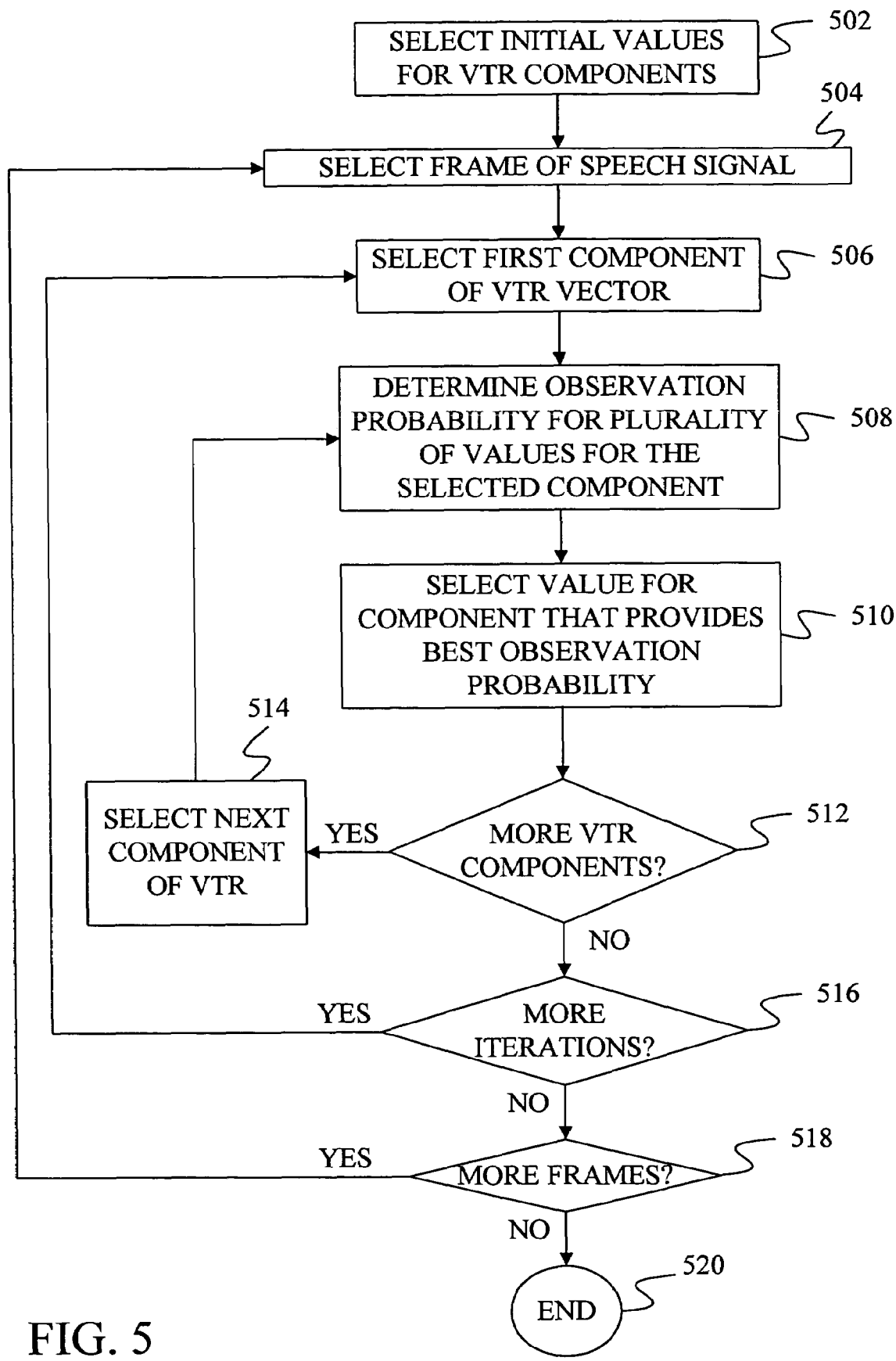
FIG. 5 is flow diagram of a method of determining values for components of a vocal tract resonance vector under one embodiment of the present invention.

The flow diagram of FIG. 5 shows the steps involved in the greedy algorithm of the present invention, which are performed in step 306 of FIG. 3.

At step 500 of FIG. 5, initial values for the VTR vectors are selected. During the first iteration of step 306, these initial values are the values identified by rough formant tracker 436 at step 302. During successive iterations, these values are the values identified in the previous iteration of step 306.

After the initial values for the VTR vectors have been selected, a frame of the training speech signal is selected at step 504. At step 506, an element of the VTR vector for the selected frame is selected for optimization. While keeping the values of the other elements of the VTR vector constant, the probability of Equation 12 is evaluated for each possible value of the selected element at step 508. The value of the element that provides the best value for the probability is then stored at step 510.

At step 512, the method determines if there are other components of the current VTR vector to be optimized. If there are, the next component is selected at step 506. Step 508 is then performed for the newly selected component while keeping the values of the other components constant. Note that during the optimization of this second component, the optimized value of the first component is used in Equation 12.

When all of the components of the current vector have been optimized at step 512, the method determines if an additional iteration of optimizing the current VTR vector should be performed at step 516. If more iterations are to be performed, the process returns to step 506 and the first component is selected again. During the next iteration, the optimization values for the VTR components that were determined in the first iteration are used as the static values until the values are optimized during the second iteration.

When all of the optimization iterations for the current frame have been determined at step 516, the process determines if there are more frames to process at step 518. If there are more frames, the process returns to step 504 and selects the next frame of the speech signal. When there are no more frames to process at step 518, the process ends at step 520. Once the sequence of VTR vectors have been optimized, there is one VTR vector for each frame.

After the VTR sequence has been updated at step 306, the process of FIG. 3 determines if more iterations for updating the residual model parameters and the VTR vector sequence should be performed at step 308. If more iterations are to be performed, the process returns to step 304 where the updated VTR vector sequence is used in Equation 5 and 6 to update h and D at step 304. Step 306 is then repeated using the new values of h and D to update the VTR vector sequence.

When no more training iterations are to be performed at step 308, the training ends at step 310.

The method of FIG. 5 can also be used to identify a VTR sequence after the system has been trained. Specifically, once h and D have been trained for the residual model, they may be used in the technique of FIG. 5 to identify a VTR sequence for an input speech signal. A block diagram of a system for identifying a VTR sequence is shown in FIG. 6.

Figure 6:
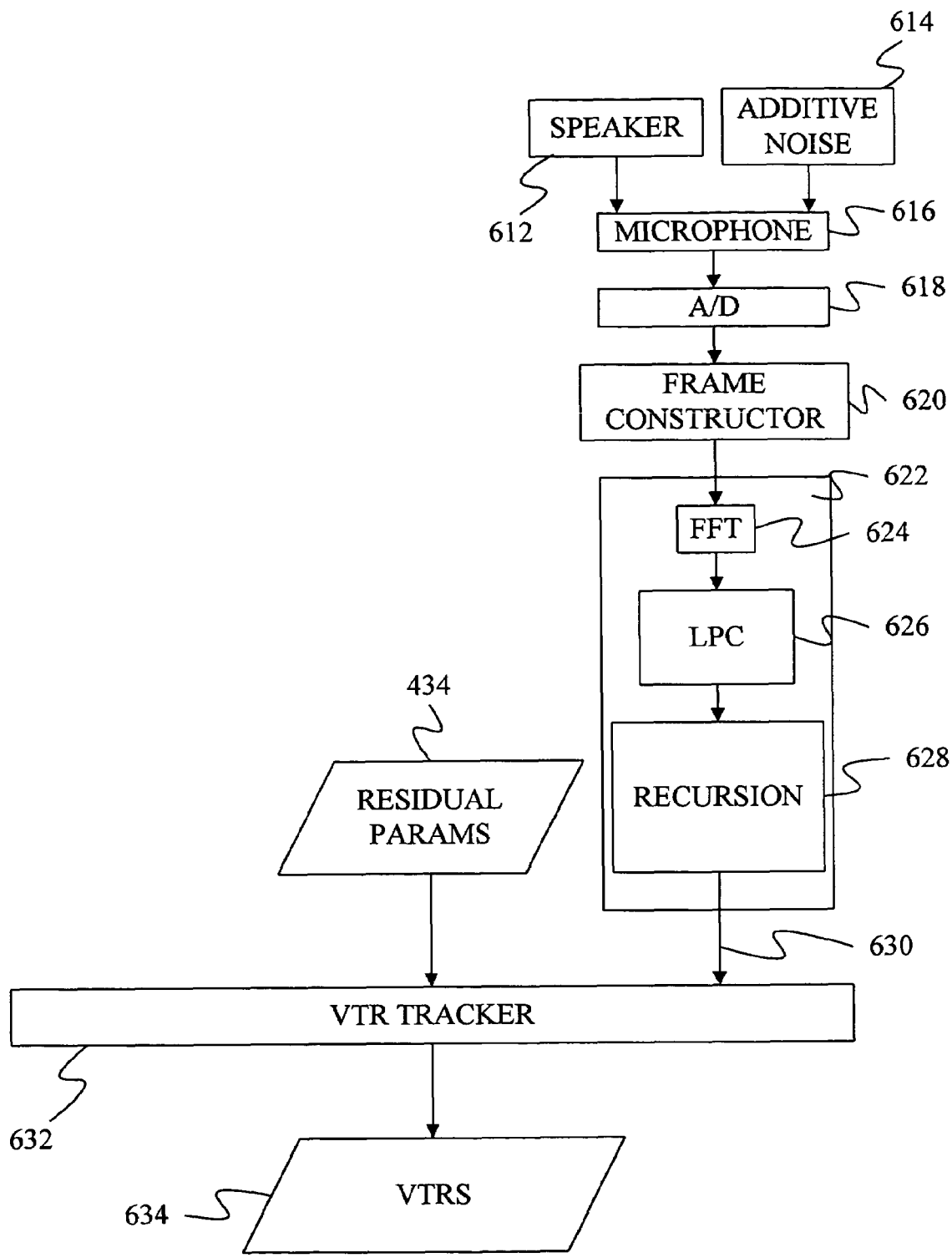
FIG. 6 is a block diagram of a formant tracking system under one embodiment of the present invention.

In FIG. 6, a speech signal is generated by a speaker 612. The speech signal and additive noise 614 are converted into a stream of feature vectors 630 by a microphone 616, A/D converter 618, frame constructor 620, and feature extractor 622, which consists of an FFT 624, LPC system 626, and a recursion 628. Note that microphone 616, A/D converter 618, frame constructor 620 and feature extractor 622 operate in a similar manner to microphone 416, A/D converter 418, frame constructor 420 and feature extractor 422 of FIG. 4.

The stream of feature vectors 630 is provided to a VTR tracker 632 together with residual parameters 434. VTR tracker 632 then uses the technique of FIG. 5 to identify a sequence of VTR values 634. In step 502, the initial values for the VTR components can be identified using a rough formant tracker such as rough formant tracker 436.

Although the present invention has been described with reference to particular embodiments, workers skilled in the art will recognize that changes may be made in form and detail without departing from the spirit and scope of the invention.

What is claimed is:

1. A method of selecting a value for a component of a vocal tract resonance vector, the method comprising:
    converting a speech signal into an observed feature vector;
    quantizing the vocal tract resonance vector search space so that the vocal tract resonance vector is limited to a set of allowed values;
    selecting static values for the components of the vocal tract resonance vector;
    determining a plurality of values for a function of the vocal tract resonance vector, each value of the function representing a simulated feature vector and each value of the function determined using a different value for one component of the vocal tract resonance vector while using the static values for all other components of the vocal tract resonance vector;
    for each value of the one component, determining a probability of an observed feature vector based on the observed feature vector, the value of the function determined using the value of the one component in the vocal tract resonance vector, and a mean of a residual model that models the difference between observed feature vectors and simulated feature vectors, to form a plurality of probabilities; and
    selecting a value for the one component based on the plurality of probabilities without determining a probability for all allowed values of the vocal tract resonance vector.

2. The method of claim 1 further comprising:
    setting the selected value as a new static value for the one component;
    determining a second plurality of values for the function of the vocal tract resonance vector, each value of the function determined using a different value for a second component of the vocal tract resonance vector while using the new static value for the one component and the static values for all other components of the vocal tract resonance vector;
    for each value of the second component, determining a probability of an observed vector based on the observed vector, the value of the function determined using the value of the second component, and the mean of the residual model, to form a second plurality of probabilities; and
    selecting a value for the second component based on the second plurality of probabilities without determining a probability for all allowed values of the vocal tract resonance vector.

3. The method of claim 1 further comprising selecting a value for each component of the vocal tract resonance vector.

4. The method of claim 3 wherein selecting a value for a component of the vocal tract resonance vector comprises:
    setting static values for the components of the vocal tract resonance vector other than the component for which a value is being selected;
    determining a plurality of values for a function of the vocal tract resonance vector, each value of the function determined using a different value for the component of the vocal tract resonance vector while using the static values for all other components of the vocal tract resonance vector;
    for each value for the component, determining a probability of an observed vector based on the observed vector, the value of the function determined using the value of the component, and the mean of the residual model, to form a plurality of probabilities; and
    selecting a value for the component based on the plurality probabilities without determining a probability for all allowed values of the vocal tract resonance vector.

5. The method of claim 3 further comprising determining the values of each component of a sequence of vocal tract resonance vectors.

6. The method of claim 5 further comprising using the sequence of vocal tract resonance vectors to train the residual model mean.

7. The method of claim 6 further comprising using the residual model mean to determine updated values for the components of the vocal tract resonance vectors in the sequence of vocal tract resonance vectors.

8. The method of claim 1 wherein the function is a sum of sub-functions, each sub-function comprising at least one component of the vocal tract resonance vector.

9. The method of claim 8 wherein no two sub-functions comprise the same component of the vocal tract resonance vector.

10. A computer-readable storage medium encoded with computer-executable instructions that when executed by a computer cause the computer to perform steps comprising:
converting a speech signal into an observed feature vector;
sequentially determining a value for each component of a vocal tract resonance vector, wherein determining a value for a component comprises:
determining a plurality of values for a simulated feature vector, separate from the vocal tract resonance vector, using a plurality of respective values for the component while keeping the values of other components constant;
computing a plurality of probabilities of observed feature vector, each probability based on a respective one of the plurality of values for the simulated feature vector, the observed feature vector, and a mean of a residual model that models the difference between observed feature vectors and simulated feature vectors; and
using the plurality of probabilities to select a value for the component from only the plurality of respective values for the component used to form the plurality of values for the simulated feature vector.

11. The computer-readable storage medium of claim 10 further comprising determining values for the components of a plurality of vocal tract resonance vectors.

12. The computer-readable storage medium of claim 11 further comprising using the plurality of vocal tract resonance vectors to train the mean for the residual model.

13. The computer-readable storage medium of claim 12 further comprising using the mean of the residual model to update the values of the components of the plurality of vocal tract resonance vectors.

14. The computer-readable storage medium of claim 10 wherein the values of each component of the vocal tract resonance vector are constrained to a limited set of possible values.

15. The computer-readable storage medium of claim 10 wherein the value of the simulated feature vector is determined using a summation over a set of sub-functions.

16. The computer-readable storage medium of claim 15 wherein each sub-function is function of at least one component of the vocal tract resonance vector.

17. The computer-readable storage medium of claim 16 wherein no two sub-functions are functions of the same component of the vocal tract resonance vector.

* * * * *